United States Patent [19]
Griffiths

[11] Patent Number: 5,913,038
[45] Date of Patent: Jun. 15, 1999

[54] SYSTEM AND METHOD FOR PROCESSING MULTIMEDIA DATA STREAMS USING FILTER GRAPHS

[75] Inventor: Laurence Kelvin Griffiths, Shirley, United Kingdom

[73] Assignee: Microsoft Corporation, Redmond, Wash.

[21] Appl. No.: 08/766,795

[22] Filed: Dec. 13, 1996

[51] Int. Cl.[6] .............................. G06F 13/38; G06F 15/17
[52] U.S. Cl. ................................. 395/200.61; 395/200.66
[58] Field of Search ....................... 395/200.61, 200.66, 395/200.49, 551, 650, 835

[56] References Cited

U.S. PATENT DOCUMENTS

| | | | |
|---|---|---|---|
| 5,333,299 | 7/1994 | Koval et al. ............................. | 395/551 |
| 5,388,264 | 2/1995 | Tobias, II et al. . | |
| 5,390,138 | 2/1995 | Milne et al. . | |
| 5,487,167 | 1/1996 | Dinallo et al. .......................... | 395/650 |
| 5,581,706 | 12/1996 | Jessup, Jr. et al. ................. | 395/200.66 |
| 5,642,477 | 6/1997 | DeCarmo et al. ....................... | 395/551 |
| 5,712,976 | 1/1998 | Falcon, Jr. et al. ................. | 395/200.61 |
| 5,761,417 | 6/1998 | Henley et al. ...................... | 395/200.61 |

FOREIGN PATENT DOCUMENTS

| | | |
|---|---|---|
| WO 95/08147 | 3/1995 | WIPO . |
| WO 95/08149 | 3/1995 | WIPO . |
| WO 95/08151 | 3/1995 | WIPO . |

OTHER PUBLICATIONS

Kjelldahl, L. (ed.), "Multimedia: Systems, Interaction and Applications," 1st Eurographics Workshop, Stockholm, Sweden, Apr. 18–19, 1991, pp. 101–111, Springer Verlag (1991).

Gibbs, Simon, "Composite Multimedia and Active Objects," *OOPSLA*, pp. 97–112 (1991).

Gibbs, Simon, "Application Construction and Component Design in an Object–Oriented Multimedia Framework," 3rd International Workshop on Network & Operating System Support for Digital Audio & Video, Nov. 1992, pp. 394–398.

*Primary Examiner*—Mark H. Rinehart
*Attorney, Agent, or Firm*—Jones & Askew, LLP

[57] ABSTRACT

Multimedia data processing accomplished by automated assembly of a filter graph comprising filters operative to conduct processing functions on data streams. The filter graph can be assembled by selecting appropriate filters that can handle the data processing requirements for the desired data stream(s). For example, a graph can be constructed by (1) selecting a set of filters, including an appropriate file reader compatible with the media type of the data stream(s), a demultiplexer for separating multiplexed data, a decoder for decoding encoded data, and a renderer to display or sound the data, and (2) combining these filters within the architecture of a filter graph to efficiently process the multimedia data.

31 Claims, 7 Drawing Sheets

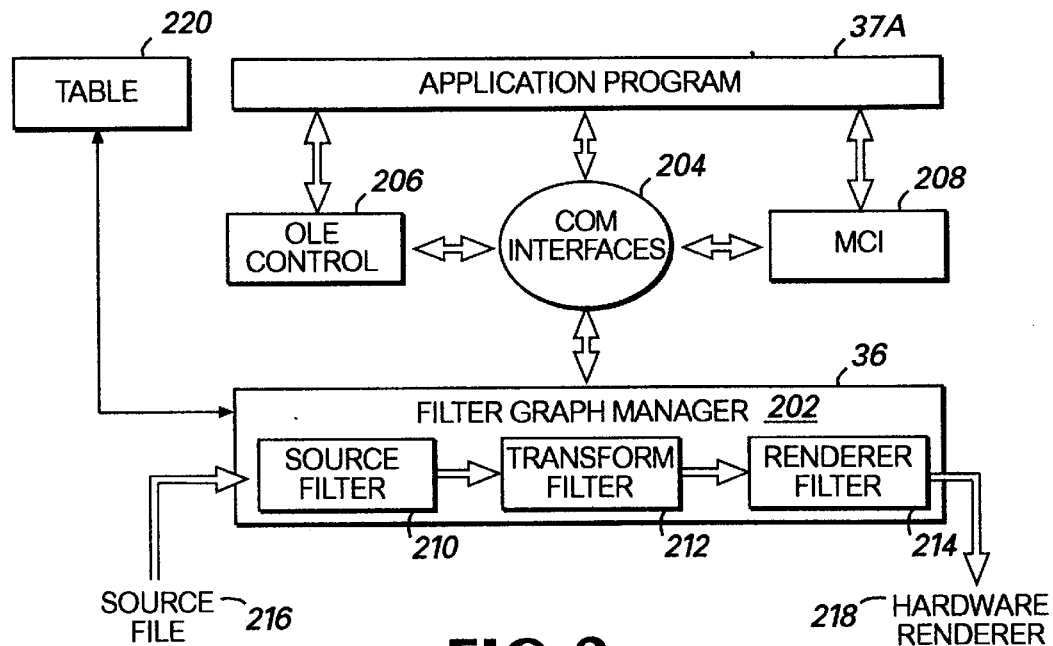
FIG.2
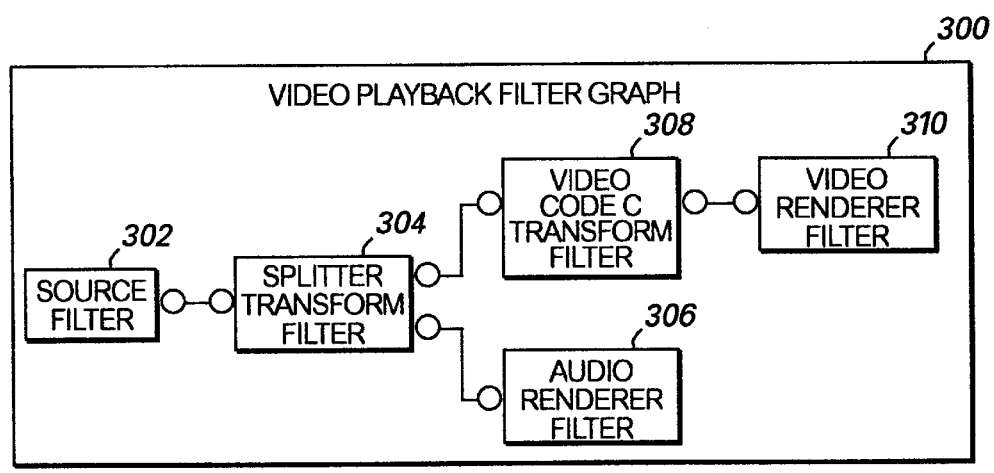
FIG.3
FIG.4A  FIG.4B  FIG.4C

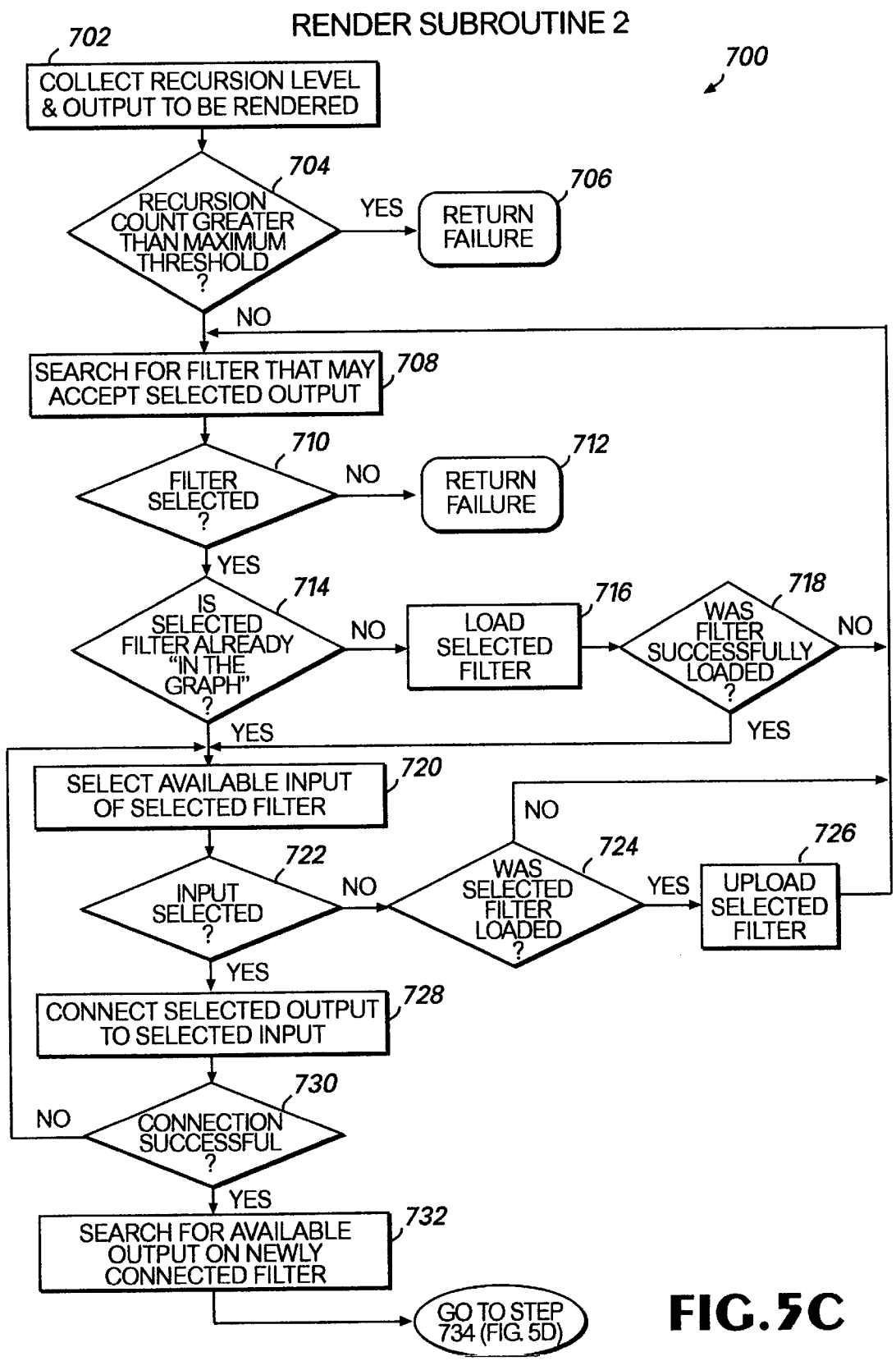

SYSTEM AND METHOD FOR PROCESSING MULTIMEDIA DATA STREAMS USING FILTER GRAPHS

RELATED APPLICATION

This application is related to U.S. patent application Ser. No. 08/767,594, filed on Dec. 14, 1996, entitled "A System and Method for Maintaining Audio and Video Synchronization."

TECHNICAL FIELD

The present invention relates generally to processing of multimedia data and, more particularly, is directed to constructing a graph by connecting filter components to process multimedia data streams.

BACKGROUND OF THE INVENTION

Power computer users and video game players alike demand a computer system that can support a presentation of multimedia data, including graphic, audio and imaging information. The popularity of multimedia presentations has encouraged the development of a variety of multimedia data formats, such as compressed video (Movie Picture Experts Group (MPEG)), uncompressed video (Yuv or RGB formats), compressed audio, and uncompressed audio. Early multimedia systems were compatible with a limited set of data formats, and typically operated in a uniform manner to play a video and/or audio stream. For example, only those video files having a particular data format compatible with multimedia systems could be read and rendered by these early computer systems.

Later multimedia systems, such as Microsoft's "Video For Windows" software program, used replaceable sections within a rigid format to handle more than one type of multimedia data format. The replaceable sections represented functional components for processing multimedia streams. The functional components typically included a file reader, a data stream splitter to split video and audio data streams, a decoder for decoding each data stream, and a renderer for displaying the video stream and presenting or "sounding" the audio stream. The default file reader could be replaced with a different one to support the reading of a different file format, such as Audio Video Interleaved (AVI) or Apple's QuickTime. Likewise, the decoder was replaceable to allow a different encoding technique, such as Intel Corporation's Indeo encoding scheme or Run-time Length Encoding (RLE), and the renderer could be replaced to vary the presentation of the video or audio streams. By replacing a section with another section compatible with a different data format, one could use a multimedia system with a wide variety of data formats.

Although the sections of these multimedia systems were replaceable, the format for processing multimedia data was fixed, i.e., only certain processing functions were supported by these sections, and the ordering of these functions sections was fixed. For example, a data stream splitter must follow a file reader, a decoder must be placed prior to the renderer, and so forth. It was difficult to disable or bypass one or more of the ordered functions of this structured system to perform complex multimedia tasks. This rigid format prevented the simple combination of two files, each containing a video stream, to produce a "merged" video effect. Thus, there is a need for a flexible multimedia system that can handle a wide variety of data formats and perform complex processing tasks.

The present invention addresses these needs by automatically combining software components, called "filters", into a graph comprising a chain or chains of filters. The graph is typically constructed by connecting the output of one filter to the input of the next filter to create a data system, whereby resulting data streams can be split or merged. By connecting filters together via a graph mechanism, it is possible to perform complex operations more easily than prior structured multimedia architectures. The range of processing tasks which can be easily performed by the filters of a graph constructed in accordance with the present invention is much greater than tasks performed by a multimedia architecture having a rigid format, even allowing for the use of replaceable sections.

SUMMARY OF THE INVENTION

The present invention is directed to the construction of a graph by automatically connecting filters to perform processing operations upon data streams representing a variety of multimedia data formats. The present invention can assemble the graph by selecting appropriate filters that can handle the data processing requirements for the desired data stream(s). For example, a graph can be constructed by (1) selecting a set of filters, including an appropriate file reader compatible with the media type of the data stream(s), a demultiplexer or parser for separating multiplexed data, a decoder for decoding encoded data, and a renderer to display or sound the data, and (2) combining these filters within the architecture of a filter graph to efficiently process the multimedia data. Filters are operative to conduct assigned multimedia processing functions and include input(s) and/or output(s) to support their assigned operations.

A common filter graph comprises a chain of connected filters, such as a file reader filter; a parser filter; a decoder filter; and a renderer filter. The file reader filter, also described as a source filter, understands the format of a source file and can efficiently read the source file from its storage medium. The parser filter determines the types of data in the source file and, if necessary, demultiplexes data to form separate form streams. The decoder filter can decode one or more of the data streams. The renderer filter can render data streams by drawing a decoded video stream and, if appropriate, by sounding a decoded audio stream. The filters are connected into a filter chain by connecting inputs of the filters to corresponding outputs. Because the file reader filter is responsible for reading the source file, it typically includes an output, whereas the renderer filter typically includes an input because it renders a data stream. Consequently, the first filter in a filter chain is typically a file reader filter, and the final filter within a filter chain is typically a renderer filter.

To support the construction of a filter graph, a table or database, stored in a memory storage device, can be used to define the characteristics of available filters. The table can be maintained as a portion of the "registry" of an operating system. Each stream of data can be characterized by a "media type." Each media type can be further described by a major type, a minor type or sub-type, and type details. Major types include video, audio, still images, etc. For example, the major type of a video data stream can include the minor types of MPEG and AVI, and these minor types can include type details, such as Yuv and RGB. Thus, each filter has stored in the table a list of major types and minor types which the filter can accept. In addition to a listing of media types, the table can include, for each filter, the number of inputs and outputs and a "Merit" figure. The Merit figure controls the order in which filters are tried, so that, having found filters that might work, the filter with the highest Merit can be tried first.

Turning now to a first aspect of the present invention, a graph can be constructed by combining filters in successive fashion to render a given source file. First, a determination is made whether the source file is found on a local or remote storage medium. Second, an inquiry is conducted to see what type of data is stored in the source file. A determination of the type of source file allows a media type to be assigned to data stream(s). To support this determination, the table can include a listing of various media types and corresponding values for data portions or bytes at particular offsets within a source file. In the event that an examination of the source file at the listed data portions results in a match of the listed values, then the source file is compatible with the media type associated with these portions/values. In other words, for each set of data portions and values, there typically exists a corresponding media type. The media type of the source file and the location of the file (local storage medium, such as a disk, or a remote storage medium, such as a server on the Internet) allows the selection of an appropriate file reader filter from the table. The file reader filter is then loaded to support a reading of the data stream(s) in the source file.

An inquiry is then conducted to determine the available outputs of the selected filter. For each output, the table is examined to locate a filter that can accept the output as an input. If there are no outputs, then the graph is complete. Because the table typically lists major and minor types, rather than complete media types, it is possible that any given candidate will actually fail to accept the input. By eliminating filters which are not to be tried, however, an improvement in the speed for constructing a graph can be accomplished. Of the filters which might accept the data stream as an input, a filter compatible with the data stream to be processed and having the highest Merit can be chosen (and loaded, if required). This use of the Merit figure to identify a likely filter provides the advantage of avoiding the time-consuming operation of loading a filter, only to discover that it does not work.

An attempt is made to connect the filters together by connecting the input of the initial filter to the output of the selected filter. If a successful connection is achieved, then the selected filter is examined to see what outputs it has and the inquiry described above is completed anew for this filter. It will be appreciated, however, that this recursive process could result in an attempt to construct an infinite chain of filters. To prevent this undesirable activity, a limit of the number of filters in a chain length can be set, typically a maximum threshold of five filters in a filter chain. If the chain already includes the predetermined number of maximum filters and has not yet reached a termination point (i.e., the last filter in the chain still has an output that needs a connection), then this filter is rejected and another search of the table is conducted to find a replacement filter (typically the filter having the next highest Merit figure). If a match is not found, then the last filter in the chain is disconnected (and typically eventually unloaded), and a search of the table is conducted to locate a replacement for the disconnected filter.

In view of the foregoing description, it is readily apparent that the automated graph building operations supported by the present invention are completed in a recursive fashion. Given a particular filter as a starting point, a graph can be constructed by, for each of its outputs, selecting and connecting another filter and conducting these tasks for each new filter in the filter chain. The recursive performance of rendering tasks, as described above, can either succeed or fail to construct a graph filter for rendering the data stream(s) of a source file.

A filter can be conveniently regarded as being in one of three states. It can be "available," meaning that a copy of this filter is present on some storage medium and can be loaded and used. The filter can be "in the graph," meaning that it has been loaded from whatever medium it was available on and has been incorporated into the architecture of the filter graph. For example, a filter graph manager, which controls the assembly of the filter graph, may have received an instruction to incorporate the filter within the filter graph but has not yet completed the necessary connections. The third state, called the "spare" state, occurs as an optimization. Filters are often loaded and inserted into the filter graph only to be rejected and then again later required. Rather than unloading the filter on rejection, it is retained, but is not in the graph. The filter, or an identifier for that filter, is "placed" on a separate list (called the Spares list) maintained in a memory storage device. If the filter is required later for use in the filter graph, it can be accessed via the Spares list much faster than would be the case if it had been unloaded. Thus, the only significant difference between an available filter and a spare filter is that a spare filter is available much faster. For all other purposes, available and spare are equivalent states. In view of the foregoing, filters which are in the graph can be tried first, before looking for other filter candidates, namely, spare or available filters.

For another aspect of the present invention, filters already in the graph, typically as a result of attempting to construct a graph or pre-loaded by an underlying application program, can be "tried out" before searching the table for a filter with the highest Merit figure. This has at least two beneficial effects. First, preloading a filter into the graph allows the application program to give "hints" for graph construction. For example, by pre-loading a filter known to be useful, the application program effectively provides an instruction to first try this filter prior to using another filter having a higher Merit figure. Second, it allows the construction of convergent graphs. Also, it will be appreciated that the task of "trying out" a filter that has already been loaded is more efficient then selecting a filter that requires loading prior to any attempted connection of input/output pins.

For yet another aspect of the present invention, a score can be maintained during attempted rendering operations to indicate how much success has been achieved by those operations. It is desirable to maintain a score because there exists cases where a partial success is the "best" result that can be achieved for any filter graph, but where this result is not known until late in the filter graph construction process. At each step or level of the graph building process, the score is tracked. This gives rise to a three-component score. The first component is the proportion of the data streams of the source file currently under consideration for processing in the filter graph—this is called the "trial proportion." The second component is the proportion of the data streams in the file for which a graph has been successfully constructed—this is called the "working proportion." The working proportion is derived from the trial proportion figures as a cumulative total of the trial proportions for which a filter graph was completed. The third component is the total number of filters in the graph. For purposes of discussion herein, a score can be represented by the format <trial proportion, working proportion, added filters>.

At some stage in graph building, the score might be, for example, <50%, 0, 3>, meaning that 3 filters have been added and one of two streams in the source file is under consideration, but that no leg of the graph had yet been fully built, so none of the data could be rendered later. The score might become <50%, 50%, 5>, meaning that one of the two data streams could be successfully rendered by this filter graph, that the graph now has five filters and that one of the two streams is under consideration. Whenever a filter having multiple outputs is added to a filter graph, the trial proportion is divided by the number of the filter outputs.

The "best" graph is the one that renders the greatest fraction of a data stream of the source file. Whenever any leg of the graph, i.e., a successful series of connections from input to output stages, is completed, the resultant score is compared with the graph exhibiting the best-so-far score. If the resultant score is better, then instructions for building that graph are stored in memory for possible subsequent use to construct the filter graph. These instructions typically comprise a list of actions, each being either an instruction to load a particular new filter or an instruction to connect existing filters. When scores are compared, only two of the components are typically considered, namely the working proportion and the added filters components, because the trial proportion is irrelevant for the comparison task. A score is "better" than another if the working proportion component is greater. For the same working proportion, a score is better if it uses fewer filters.

In view of the foregoing, it will be understood that the present invention addresses a need in the art for an automated system for processing multimedia data based on a flexible and efficient filter graph architecture. The advantages offered by the present invention will be further described below with respect to the detailed description, the appended claim set and the drawings.

BRIEF DESCRIPTION OF THE DRAWINGS

FIG. 2 is a block diagram illustrating the components of an exemplary embodiment of the present invention.

FIG. 3 is a block diagram illustrating a filter graph constructed in accordance with an exemplary embodiment of the present invention.

FIGS. 4A, 4B, and 4C, collectively described as FIG. 4, are diagram illustrating pin configurations for filters of an exemplary embodiment of the present invention.

FIGS. 5A, 5B, 5C, and 5D, collectively described as FIG. 5, are logical flow diagrams illustrating a computer-implemented process for constructing a filter graph by combining filters for processing of multimedia data in accordance with an exemplary embodiment of the present invention.

DETAILED DESCRIPTION OF THE DISCLOSED EMBODIMENTS

Figure 1:
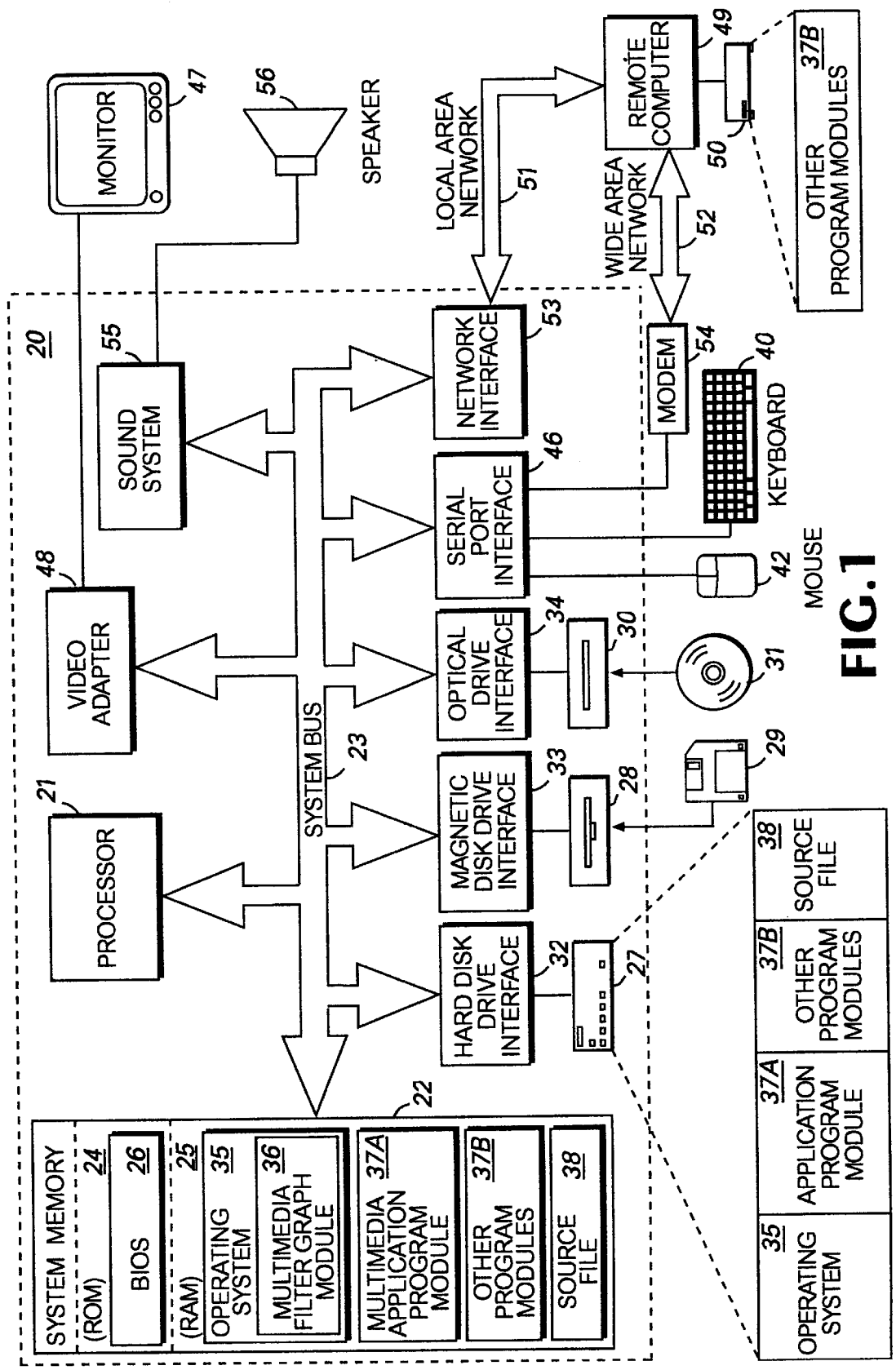
FIG. 1 is a block diagram illustrating the preferred operating environment for an exemplary embodiment of the present invention.

The present invention is directed to controlling and processing of streams of multimedia data, and allows users to play digital movies encoded by the Motion Picture Experts Group (MPEG) compression method. The present invention provides a computer-implemented process for constructing a filter graph to combine filters for processing of multimedia data. The preferred embodiment of the present invention is represented by Microsoft's "ACTIVE MOVIE" Software Development Kit (SDK), which supports multimedia data control and processing for the "WINDOWS NT" and "WINDOWS 95" operating systems developed by Microsoft Corporation of Redmond, Wash.

Briefly described, a multimedia filter graph module (MFG module), also known as a filter graph manager, allows users to play multimedia, such as digital movies encoded using the MPEG digital video compression standard, on a computer system. In general, the MFG module defines how streams of time-stamped multimedia data (typically audio and video data) are controlled and processed by using modular software components, called "filters," connected together in particular arrangements, called "filter graphs." A filter is a multimedia object capable of performing some kind of process on multimedia data, such as reading audio and/or video data from an MPEG-encoded source file or splitting audio and video data into distinct streams of compressed data. Different filters are used for different functions and for different formats of multimedia data, such as the QuickTime format for digital movies established by Apple Computer of Cupertino, Calif. or the Audio Visual Interleaved (AVI) format. A filter graph can be viewed as a set of functional nodes, i.e., filters, linked together in such a way as to perform a desired result of rendering data. The filters within the filter graph can be connected such that the output of one filter typically becomes the input for the next filter. In this manner, a stream of multimedia data can be read, split-apart, decoded, and rendered or played by different filter components.

In general, the MFG module controls how a filter graph is built and how the multimedia data is moved and processed through the individual filter components that make up of the filter graph. Digital movie information is generally processed by the MFG module by reading the multimedia data, separating the data into distinct audio and video streams, decoding these streams, and synchronously rendering these streams into buffers where the audio and video are played by associated hardware components. The MFG module also provides an interface between a multimedia application program and the filter graph used to process the multimedia data. Applications programs can make direct calls to individual filter components, typically via calls to interfaces supported by the MFG module.

The detailed description which follows is represented largely in terms of processes and symbolic representations of operations by conventional computer. The processes and operations performed by the computer include the manipulation of signals by a processor and the maintenance of these signals within data sets or data structures resident in one or more memory storage devices. These symbolic representations are the means used by those skilled in the art of computer programming and computer construction to most effectively convey teachings and discoveries to others skilled in the art. For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, elements, symbols, nodes, frames, samples, data, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as creating, rendering, comparing, building, drawing, determining, connecting, storing, selecting, playing, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of a program module that runs in tandem with an operating system on a personal computer, those skilled in the art will recognize that the invention may also be implemented in combination with other program modules. Generally, program modules include routines, programs, components, filters, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from a CD-ROM disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above includes the hard disk drive 27, a removable magnetic disk 29 and an optical disk 31, such as a CD, it should be appreciated by those skilled in the art that other types of media which are readable by a computer, such as magnetic cassettes, flash memory cards, digital video disks and tapes, Bernoulli cartridges, and the like, may also be used in the exemplary operating environment.

A number of program modules may be stored in the drives and RAM 25, such as an operating system 35 having a multimedia filter graph module 36 (MFG module). As previous described, the preferred MFG module 36 defines how streams of time-stamped multimedia data (audio and video data) are controlled and processed by using modular software components. Other program modules may be stored in the drives and in RAM 25, including one or more application programs, such as a multimedia application program module 37a, other program modules 37b, and a source file 38 containing multimedia data.

The operating system 35 (and its MFG module 36), in conjunction with the BIOS 26 and associated device drivers, provides the basic interface between the computer's hardware and software resources, the user, and program modules such as the multimedia application program module 37a. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. One or more speakers 56 are also connected to the system bus 23 via an interface, such as a sound system 55. In addition to the monitor 47 and speaker 56, personal computers typically include other peripheral output devices (not shown), such as printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections show are exemplary and other means of establishing a communications link between the personal computer 20 and the remote computer 49 may be used.

As discussed earlier, the preferred embodiment of the present invention is embodied in the MFG module 36, which supports multimedia data control and processing within Microsoft Corporation's "WINDOWS 95" or "WINDOWS NT" operating systems. However, it should be understood that the invention can be implemented for use with other operating systems, such as Microsoft Corporation's "WINDOWS 3.1" operating system, IBM Corporation's "OS/2" and "AIX" operating systems, SunSoft's "SOLARIS" operating system used in workstations manufactured by Sun Microsystem, Hewlett-Packard's "HP-UX" and "RT-UX" operating systems, and the operating system used in "MACINTOSH" computers manufactured by Apple Computer, Inc.

From this brief description, it should be appreciated that operating systems, such as the "WINDOWS 95" and "WINDOWS NT" operating system, are complex and provide a wide variety of services that allow users and programs to utilize the resources available in the personal computer. Those skilled in the art will be familiar with operating systems and their various features. Likewise, those skilled in the art will appreciate that the preferred MFG module 36 provides a wide variety of features and functions in addition to those included in the brief description presented herein.

The present invention, as embodied by the "ACTIVE MOVIE" program, allows users to play MPEG-encoded digital movies and sounds. This playback capability is carried out either in software or by utilizing video and audio hardware cards that support the Microsoft Direct X set of APIs in Microsoft's "WINDOWS 95" operating system. This embodiment can support software playback in Microsoft's "WINDOWS NT" operating system and will support hardware-assisted playback when DirectX is supported in "WINDOWS NT". This exemplary embodiment is also capable of playing movie files in AVI or Apple's QuickTime formats. It will be understood, however, that the MPEG playback service is only one application. Because of the flexible, modular design of architecture of the disclosed embodiments of the present invention, there are many potential uses and applications for the graphs constructed in accordance with these embodiments. For example, filter graphs can be constructed to implement video capture, control of remote devices such as VCRs, animation sequencing, and MIDI recording and editing.

Turning now to FIG. 2, which illustrates the primary components of an exemplary embodiment of the present invention, multimedia data can be controlled and processed by using modular functional components called filters, connected in a filter graph, for processing multimedia data. A filter graph manager 202, also described as the MFG module, controls the assembly of a filter graph 203. The filter graph manager 202 also can manage the flow of data streams within the filter graph 203 by directing the movement of data through the filter components of the filter graph.

To support the construction of a filter graph, the filter graph manager 202 can search for a configuration of filters that will render a particular media type. When searching for a rendering configuration, the filter graph manager 202 can use a filter mapper component (not shown), which first reads a table 220, such as the registry of the operating system 35, and determines the types of available filter components. The filter manager 202 then attempts to link together or otherwise connect filter components that can a corresponding data type until the stage of a rendering filter is reached during assembly of the filter graph 203. Filter graphs, however, also can be preconfigured, in which case the filter graph manager 202 does not need to search for a configuration.

The table 220, which is preferably maintained as a portion of a registry of the operating system 35, contains listings defining the characteristics of available filters. Each filter has stored in the table 220 a list of major types and sub-types for data streams that it can accept as an input. For each filter, the table 220 also contains the number of inputs and outputs and a "Merit" figure. Filters typically are assigned a high Merit figure if they are quick to load, offer efficient operation, or are common. For example, a video renderer filter is assigned a high Merit figure because it is typically used as the last filter in most filter graphs. The table 220 also can list filter combinations that do not work when combined; this information can improve the speed of building a graph. By accessing the information in the table 220 prior to selection of a filter, the filter graph manager can efficiently determine if a particular filter may work in the graph, thereby avoiding the possible loading of a particularly poor filter choice.

The filter graph manager 202 can control the media stream by allowing the application program 37A or OLE control 206 to specify certain activities, such as starting, pausing, or stopping the media stream, playing for a particular duration or seeking to a particular point in the data stream. The filter graph manager 202 then calls appropriate methods on the filters to invoke them. It also allows filter components to post events that can be retrieved by the application, so an application program can, for example, retrieve status information about some special filter it has installed.

The filter graph manager 202 also provides a set of OLE Component Object Model (COM) interfaces 204 to allow communications between the filter graph and the application program 37A. A program module, such as the application program 37A, can make a direct call to the interfaces 204 to control the media stream or to retrieve filter events. Alternatively, a program module can use an OLE control 206 for higher-level programming. A subset of commands for a media control interface (MCI) 208 is also available for compatibility purposes.

A filter graph, such as the filter graph 203, typically comprises a linked collection of filter components of different types. In general, filters components can be categorized into one of three filter types: source, transform, or renderer. For example, the filter graph manager 202 controls an exemplary filter graph, such as the filter graph 203, comprising each of the three types of filters. A source filter 210, which accepts and reads data from a source 216, such as a file stored on a storage medium or information fed via a satellite feed, and introduces it into the filter graph 203. A transform filter 212 accepts the data from the source filter 210, processes the data, and forwards the processed data to the renderer filter 214. The renderer filter 214 renders the data; typically the rendered output is supplied to a hardware device 218, but potentially could be rendered to any location that accepts media input (such as a filed maintained on volatile memory, flexible disk, hard disk, etc.). it will be understood that the filter graph shown in FIG. 2 represents only one of numerous possible constructions of filter graphs, and that the present invention is not limited to a particular architecture for a filter graph.

Although three basic types of filters are described above, those skilled in the art will appreciate that a filter can represent a combination of filter types. For example, a filter can operate as an audio renderer, but also can act as a transform filter by passing through video data. Moreover, transform filters encompass a variety of transformation functions, including splitting a single data stream into multiple data streams, i.e., a splitter, and merging two or more data streams into a single data stream. Indeed, a transform filter can be constructed by combing processing functions in a manner similar to using building blocks to construct a building. Typically, however, filters fit the above-described three basic filter types, namely source, transform, or renderer filters.

Filters of a filter graph architecture, such as the filters 210, 212, and 214, are preferably implemented as COM objects, each implementing one or more interfaces, each of which contains a predefined set of functions, called methods. Methods are called by the application program 37A or other component objects in order to communicate with the object exposing the interface. The application program 37A (or OLE control 206) also can call methods on interfaces exposed by the filter graph manager object.

This architecture for processing multimedia data is also described in a related application, U.S. patent application Ser. No. 08/767,594, entitled "A System and Method for Maintaining Audio and Video Synchronization," filed on Dec. 14, 1996, assigned to a common assignee, Microsoft Corporation, and hereby fully incorporated herein by reference.

Turning now to FIG. 3 for a representative example of the architecture of a typical filter graph, a filter graph 300 supports the processing of audio and compressed video by use of a chain of five filters. A source filter 302 can read the data from a source file, which is typically maintained on a local or remote storage medium. The source filter outputs source data to a splitter transform filter 304. The splitter transform filter 304 can split the incoming data stream into a pair of data streams, namely video data and audio data streams, and pass these data streams to an audio renderer filter 306 and to a video CODEC filter 308. The audio renderer filter 306 can render the audio data stream to play the audio data via a speaker (not shown). The video CODEC transform filter 308 can decompress the video data and output a decompressed video data stream. A video renderer filter 310 accepts and renders the decompressed video data stream to support a display of the video data on a monitor (not shown). The video renderer filter 310 typically outputs the rendered video data to a hardware renderer, such as a video card, or to an output file maintained on a storage medium. Based on the review of filter types above, the source filter 302 represents a source filter, the splitter transform filter 304 and the video CODEC transform filter 308 are classified as transform filters, and the audio renderer filter 306 and the video renderer filter 310 represent renderer filters.

Filter graphs work with data representing a variety of media types, each type characterized by a data stream that is processed by the filters components of the filter graph. A filter positioned closer to the renderer filter than another filter in the flow of a data stream is said to be downstream from that filter. For example, a transform filter, such as the filter 304, is always downstream from a source filter, such as the source filter 302. Likewise, a filter closer to the source of the data than another filter is said to be an upstream filter. Data representing a media type typically flows through the chain of filters in downstream direction, but other information can travel in an upstream direction, including timing and synchronization information.

Turning now to FIGS. 4A–4C, collectively described as FIG. 4, the basic components for the preferred filter graph architecture are filter components, also simply described as filters, and pins. A filter can be implemented as a COM object that performs a single task. For each data stream that the filter handles, it exposes at least one pin. A pin can be implemented as a COM object that represents a point of connection for a unidirectional data stream on a filter. Input pins represent inputs and accept data into the filter, and output pins represent outputs and provide data to other filters. Pins can provide interfaces to connect with other pins and for transporting data. The pin interfaces support the following: the transfer of time-stamped data using shared memory; negotiation of data formats at each pin-to-pin connection; and buffer management and buffer allocation negotiation for minimizing data copying and maximizing throughput.

As shown in FIG. 4A, a source filter 400 provides one output pin for each stream of data in the file. A transform filter 402, shown in FIG. 4B, provides on input pin and one output pin, while an audio output filter typically exposes only one input pin. More complex arrangements are also possible. A renderer filter 404, shown in FIG. 4C, exposes only one input pin.

At a minimum, a filter component typically exposes the following interfaces, which are called primarily by the filter graph manager.

1. IFilter, which allows the enumeration of the pins on the filter and provides basic filter status and information.

2. IMediaFilter, which provides control of processing state and synchronization.

In addition, a filter might expose several other interfaces, depending on the media types supported and tasks performed.

Pin interfaces differ slightly, depending on whether they are output pins or input pins. An output pin typically exposes the following interfaces:

1. IPin, whose methods are called to allow the pin to be queried for pin, connection, and data type information.

2. IMediaPosition, which allows information about the stream's duration, start time, and stop time to be relayed from the renderer (which receives the media position instructions) upstream to the filter that is responsible for cueing the stream to the appropriate position.

3. IQualityControl, which passes quality control messages upstream from the render to the filter that is responsible for increasing or decreasing the media supply.

An input pin typically exposes the following interfaces:

1. IPin, which allows the pin to connect to an output pin and provides information about the pin and its internal connections.

2. IMemInputPin, which allows the pin to propose its own transport memory allocator, to be notified of the allocator that an output pin is supplying, to receive media samples through the agreed-upon allocator, and to flush the buffer. This interface is capable of creating a shared memory allocator object that exposes the IMemAllocator interface, which is used by the connected output pin.

3. IQualityControl, which passes quality control messages upstream from the renderer to the filter that is responsible for increasing or decreasing the media supply.

Additional information regarding these interfaces can be obtained from the "ACTIVE MOVIE" SDK, which is available from Microsoft Corporation in Redmond, Wash.

Referring again to FIGS. 1 and 2, the filter graph manager 202 can use the table 220, stored in a memory storage device, to support the construction of a filter graph comprising a chain of filters. The filter graph manager 202 typically constructs the filter graph in stages based on the information stored in the table 220 about the available filters. For example, in response to selecting a suitable reader filter to read the source file, filters can be selected, loaded, and connected in successive fashion until each data stream of the source file is (hopefully) rendered.

In view of the foregoing, one will appreciate that there can exist several filters that could perform equally well for a particular stage of the operation, but that deliver results in slightly different formats. Moreover, the available filters for the next stage can be sensitive to these differences between the available filters for the prior stage. For example, a common video data format is the compression scheme developed by MPEG, which can be decoded into uncompressed video by an MPEG decoder. Uncompressed video, however, could mean video where the color at every point is expressed as a brightness value and a separate description of the hue ("Yuv" format). Alternatively, uncompressed video could mean video where the color is expressed as the separate amounts of red, green and blue needed to make that color ("RGB" format). If a video renderer, which can draw video, accepts one of these formats and not the other, then this affects the choice of decoder because the graph builder must build a complete graph that will work. This means that the construction of a graph operates a little like playing a game of chess where an unlikely first move may be made because it leads to success in a few moves time where the obvious first move leads to ultimate failure.

To render a source file, such as the source file 216, the filter graph manager 202 builds a filter graph comprising connected filter components, such as the filters 210, 212, and 214. The filter graph manager 202 first examines the source file 216 to determine the file type and the type(s) of data stored in the source file. A determination of the type of source file allows a media type to be assigned to a corresponding data stream of the source file. To determine the file type, the filter graph manager 202 accesses the table 220 and obtains instructions to read certain portions of the source file at particular offsets, and to compare the accessed data of the source file with particular values stored in the table 220. A match of the accessed data portion to stored values results in a determination of the type of source file (and its corresponding media type). Based on the media type and the location of the file (local or remote storage medium), the filter graph manager can select an appropriate file reader filter, such as the source filter 210, from information maintained in the table 220. The filter graph manager 220 then instructs a file loader to load the file reader filter and, in turn, the filter graph manager begins to read the source file 216.

The filter graph manager 202 then determines the outputs of the present filter, in this case, the source filter 210. For each output, the filter graph manager 202 examines entries in the table 220 to locate a filter that can accept the output as an input. It will be understood that there can exist several filters which could perform equally well for a particular stage of the operation, but that deliver results in slightly different formats. If there are no outputs then the filter graph is complete. Of the filters, listed in the table 220, which are compatible with the data stream to be processed and may accept the output of the present filter as input, the filter graph manager 202 preferably selects the available filter with the highest Merit figure. An "available" filter is a filter that is maintained on a storage medium and available for loading and use. By selecting the filter having the highest Merit figure, an attempt is made to avoid the time-consuming operation of loading a filter, only to find that the selected filter does not work within the filter graph. The filter graph manager 202 arranges for the loading of the selected filter, if required, and a connection of the output of the present filter to the input of the selected filter.

If a successful connection is achieved, then the filter graph manager 202 examines the newly loaded filter to determine its outputs. The filter graph manager 202 then examines the filter information maintained in the table 220, as described above, to select an available filter having an input that matches the output of the newly loaded filter. In turn, the tasks described above are completed anew for each selected filter.

To prevent the theoretical possibility of constructing an infinite chain of filters, however, this process is completed for only a predetermined number or maximum number of filters in a chain, preferably five filters. If the chain already includes the maximum set of filters without a termination, then the present filter candidate is rejected. The filter graph manager 202 then conducts a search of the table 220 to locate a filter with the next highest Merit figure. If a match is not found, then the filter graph manager 202 coordinates disconnecting (and typically unloading) the present filter and completes another search of the table to locate a replacement filter. These graph building operations are completed by the filter graph manager 202 in a recursive fashion until either success or failure is achieved.

It is often more efficient to try out previously loaded filters before trying a filter that requires completion of the loading task. For example, it typically takes 2 milliseconds (rather than 200 milliseconds for a filter requiring the load operation) to connect a previously loaded filter in a filter chain. Thus, for another exemplary embodiment, the filter graph manager 202 gives preference to use of filters "in the graph" before searching the table 220 for an unloaded and available filter that is assigned a higher Merit figure. A filter is in the graph when it has been added from a storage medium and the filter graph manager 202 has been instructed to incorporate the filter onto the filter graph.

In addition, a "Spares list" is maintained in memory to track all previously loaded but rejected filters. For example, if the filter graph manager 202 operates to load a particular filter, and this filter fails to connect to another filter in the chain, then, rather than unloading that filter, it is kept in memory storage and placed on the list of spare filters. If the filter graph manager 202 subsequently selects a filter of that type for another part of the graph, then, rather than reloading it, this filter is used in response to information stored in the Spares list. This results in a considerable saving of time.

Filters in the graph are preferably tried in preference to filters found via the table 220 regardless of assigned Merit figures. This has at least two beneficial effects for the assembly of a filter graph. By pre-loading a filter known to be useful, an application program, such as the application program 37A, can effectively provide an instruction for the filter graph manager 202 try this filter first. Secondly, it allows the construction of convergent graphs. If a compatible filter in the graph can not be located, then an available filter compatible with the data stream to be processed and having the highest Merit figure can be tried. If this filter is on the Spares list, then the copy on the Spares list will be used to avoid the time otherwise needed to load the filter.

It will be appreciated that the assembly of a filter graph may at best result in a partial success. This result, however, may not be recognized until late in the graph building process because of the recursive nature of construction operations. For example, if a source file having audio and video streams is played on a computer that has no sound card, then the computer cannot generate the appropriate sounds. On such a system, the playing of this file preferably should not fail, but should at least succeed in displaying the video, albeit silently. Consequently, for another exemplary embodiment, the filter graph manager 202 can maintain a score during filter graph assembly to indicate how much success has been achieved.

The filter graph manager 202 preferably calculates and maintains a score based on three components, (1) a "trial proportion" representing the proportion of the data streams in the graph currently being considered for processing by the filter graph manager, (2) a "working proportion" of the data in the file that can be rendered by the chained filters, and (3) the number of filters that have been added to achieve this rendering result. At each stage of the graph building, the filter graph builder 202 calculates and tracks the score. For the calculation task, the filter graph manager 202 divides the trial proportion by the number of filter outputs when it adds a filter that has multiple outputs to the filter graph. The "best" graph is the one which renders the greatest fraction of the data in the source file.

Upon the completion of a graph leg, a "best-so-far" score can be recorded to track any partial rendering success by a particular graph. A best-so-far score is typically updated, however, only if a subsequent score for a graph leg is greater than the recorded best-so-far score. If two alternatives achieve the same degree of partial success, then the one that uses the fewest filters is taken as the best filter graph. Whenever a leg of the graph is completed, the filter graph manager 202 compares the resultant score with the best-so-far score. If the resultant score is better, then the instructions for building the corresponding graph are placed in memory for possible subsequent construction of this filter graph. These instructions typically comprise a list of actions, an action being either an instruction to load a particular new filter or an instruction to connect two existing filters.

It will be understood that there is no need to compare a score with the best-so-far score except when a leg of the filter graph is completed. The process of adding a filter in an attempt to complete a leg always makes a score worse rather than better. This result arises because the addition of the filter affects the score by leaving the working proportion component, which can be viewed as the more significant component for score comparison purposes, alone and making the added filters component worse.

In addition to being requested to "render a given file" the filter graph manager 202 can be requested to start from the output of any given filter and to complete that leg of the graph. In this case, the process is exactly as described above, except that the operation starts at the appropriate designated point. Also, the filter graph manager can instead be requested to connect the output of one filter to the input of another. This operation is again similar except that the modification to produce a best-so-far graph is not needed and in searching the registry for filters to use, it will only select filters that do have at least one output, whereas in the other operation, for filters of the same Merit figure, preference is given to filters which have no outputs.

Operation of an Exemplary Embodiment

Based on the foregoing description, the operation of an exemplary embodiment employing the use of Merit figures, the spare list, and score-keeping is described below for construction of a typical filter graph for rendering a source file having audio and video data streams on a computer system that lacks a hardware sound card.

An initial score value of 100% trial proportion, 0% working proportion and 0 added filters (<100%, 0%, 0>) is recorded as part of an initialization operation by the rendering system. Now, starting at the upstream portion of a filter graph, a file reader filter, compatible with the source file, is selected and loaded. This defines a score of 100% trial proportion, 0% working proportion and 1 added filter (<100%, 0%, 1>).

A search is conducted to locate a filter that may be connected to the output of the file reader filter. In the event that a suitable filter is not already in the graph, an available filter having the highest Merit figure is selected (at this time, the Spares list is empty). A parser filter, which can parse the data streams read by the filer reader filter, is selected and loaded for connection to an output of the source file reader filter. The input of the parser filter is successfully connected to the output of the filer reader filter. This operation defines a score of <100%, 0%, 2>.

The parser filter has two outputs, a first output for the video data stream and a second output for the audio data stream. The first output for the video data stream is selected for possible connection as an input to another filter. Because the data stream is split into two streams by the parser filter, the selected first output has a score of 50% trial performance, thus the score is <50%, 0%, 2>.

A search is conducted to locate a filter that may be connected to the first output of the parser filter. In the event that a suitable filter is not already in the graph, an available filter having the highest Merit figure is selected (again, the Spares list is at present empty). A video renderer filter, which typically has a high Merit figure, is selected and loaded in an attempt to complete the rendering of the video data stream, i.e., the first output of the parser filter, in one step. The attempted connection of the input of the video renderer filter to the first output of the parser filter, however, fails and results in the need to select an alternative filter for possible connection to the parser filter. Rather than completely unloading the video renderer filter, it is placed on the Spares list. In response to a search for an alternative filter, a video decoder filter is selected and loaded for connection to the first output of the parser filter. This connection succeeds, resulting in a score of <50%, 0%, 3>.

At this point, a search is conducted to locate a filter that may be connected to the output of the video decoder filter. The video is renderer filter is again selected, this time for possible connection to the output of the video decoder as once again it is the filter with the highest Merit. Because the video renderer filter is listed as a filter candidate on the Spares list, it does not need to be loaded. Instead, the video renderer filter can be immediately added to the filter graph. The output of the video decoder filter is successfully connected to the input of the video renderer filter, resulting in the completion of a filter chain. Because the video data stream can be rendered by the video renderer filter, there is no need to continue to look for additional filters for use in this filter chain. In other words, the video renderer filter does not have an output pin for possible connection to another filter. To score this success, the current proportion is added to the cumulative working proportion to give a score of <50%, 50%, 4>. This score represents a best-so-far score because it is greater than the initial score value of zero percent working proportion and zero added filters, i.e., <50%, 50%, 4> beats <0%, 0%, 0>, where the trial proportion is irrelevant. Consequently, the instructions for assembling this leg of the filter graph are recorded based on the best-so-far score.

The instructions for assembling the filter graph leg are listed in Table I, as shown below:

Table I

1. Load(filer reader filter)
2. Load(parser filter)
3. Connect(file reader filter, parser filter)
4. Load(video decoder filter)
5. Connect(parser filter/video output, video decoder filter)
6. Load(video renderer filter)
7. Connect(video decoder filter, video renderer filter)

Upon completing this video processing portion of the filter graph, the recursive rendering procedure returns its success to its previous caller, returning also the updated score. This effectively walks the filter chain in an upstream direction, returning to the video decoder filter, which is again selected to look for an additional output for possible connection to another filter. The video decoder filter, however, does not have another output. Thus, there is again success at this level. The score, as returned, is still <50%, 50%, 4>, which is not better than the best-so-far score, so no further recording of the graph occurs (indeed, it is the same graph).

The recursive rendering procedure again returns the success and the updated score to its previous caller. In this manner, the walk along the filter chain in the upstream direction is continued, and the next filter in-line, the parser filter, is selected to look for an additional output for possible connection to another filter. Unlike the prior examination of the video decoder filter, this search locates the second output of the parser filter, which outputs an audio data stream of the source file. For this leg of the filter graph, the score is 50% trial proportion (now trying the audio leg), 50% working proportion (successful video leg), and 4 added filters, or the score <50%, 50%, 4>.

For the selected audio output of the parser filter, an attempt is made to locate a filter for possible connection to this second output.

In the event that a suitable filter is not already in the graph, an available filter having the highest Merit figure is selected. In this case, an audio renderer is selected and loaded based on the typical high Merit figure assigned to a renderer filter. This connection between the second output of the parser filter and the input of the audio renderer filter, however, fails because there is no audio hardware component installed for operation in the computer system. Consequently, the audio renderer filter is placed on the Spares list.

Next, a search is conducted for an alternative filter that can be connected to the second output of the parser filter. In turn, the second output of the parser filter is connected to an input of the audio decoder filter. The score is now <50%, 50%, 5>.

A search is now conducted to locate a filter that can accept the output of the audio decoder filter. Based on the listing of the audio renderer filter in the Spares list, this filter is selected as a possible candidate. The connection between the audio decoder filter and the input of the audio renderer filter, however, fails because of the absence of an installed audio hardware component, such as a SoundBlaster card, in the computer system. The score remains at <50%, 50%, 5>, but there is no need to compare it with the best-so-far score because this leg has failed.

Based on the failure of this connection, a search is conducted for an alternative filter that may be connected to the audio decoder filter. No suitable alternatives are located based on a search of the registry of the operating system to locate a suitable filter candidate. In response to this failure to locate a suitable alternative filter, the audio decoder filter is disconnected from the parser. Consequently, the audio decoder filter is placed on the Spares list. In turn, a search is conducted anew for an alternative filter that may be connected to the second output of the parser. This search also fails to locate an appropriate filter. The score is now back to <50%, 50%, 4>.

In response to this failure to locate a suitable alternative filter for connection to the audio output, the parser filter is disconnected from the file reader filter. Consequently, the parser filter (and the remaining filters of the video portion of the graph leg) is placed on the Spares list. The score is now <100%, 0%, 0> because all filters have now been removed and the resultant filter graph renders none of the data. A search is then conducted for an alternative filter that operates as a parser and may be connected to the file reader filter. This search fails to locate an appropriate filter. At this point, no options remain for rendering the audio data stream, and the filter chain comprises a file reader with no other filter connected to it.

The best-so-far score shows a 50% success value for the video data stream, which is better than complete failure. In other words, the score <50%, 50%, 4> is better than <100%, 0%, 0>.

Consequently, the recorded instructions for assembly of the graph associated with this best-so-far score are accessed in memory. A filter graph is constructed in accordance with the instructions to render the video data stream. In this manner, a partial success is achieved by the filter graph construction operation.

Figure 5A:
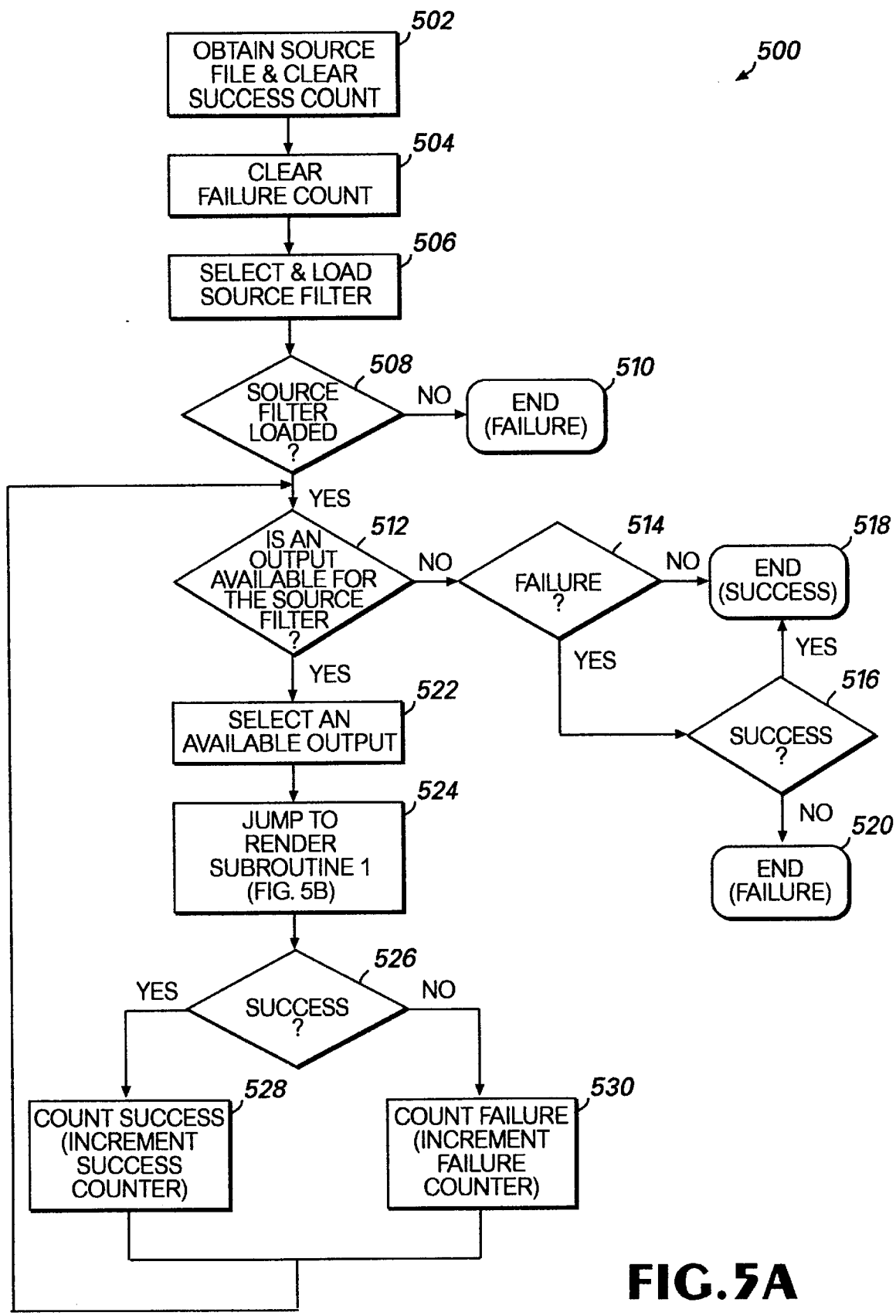
Figure 5B:
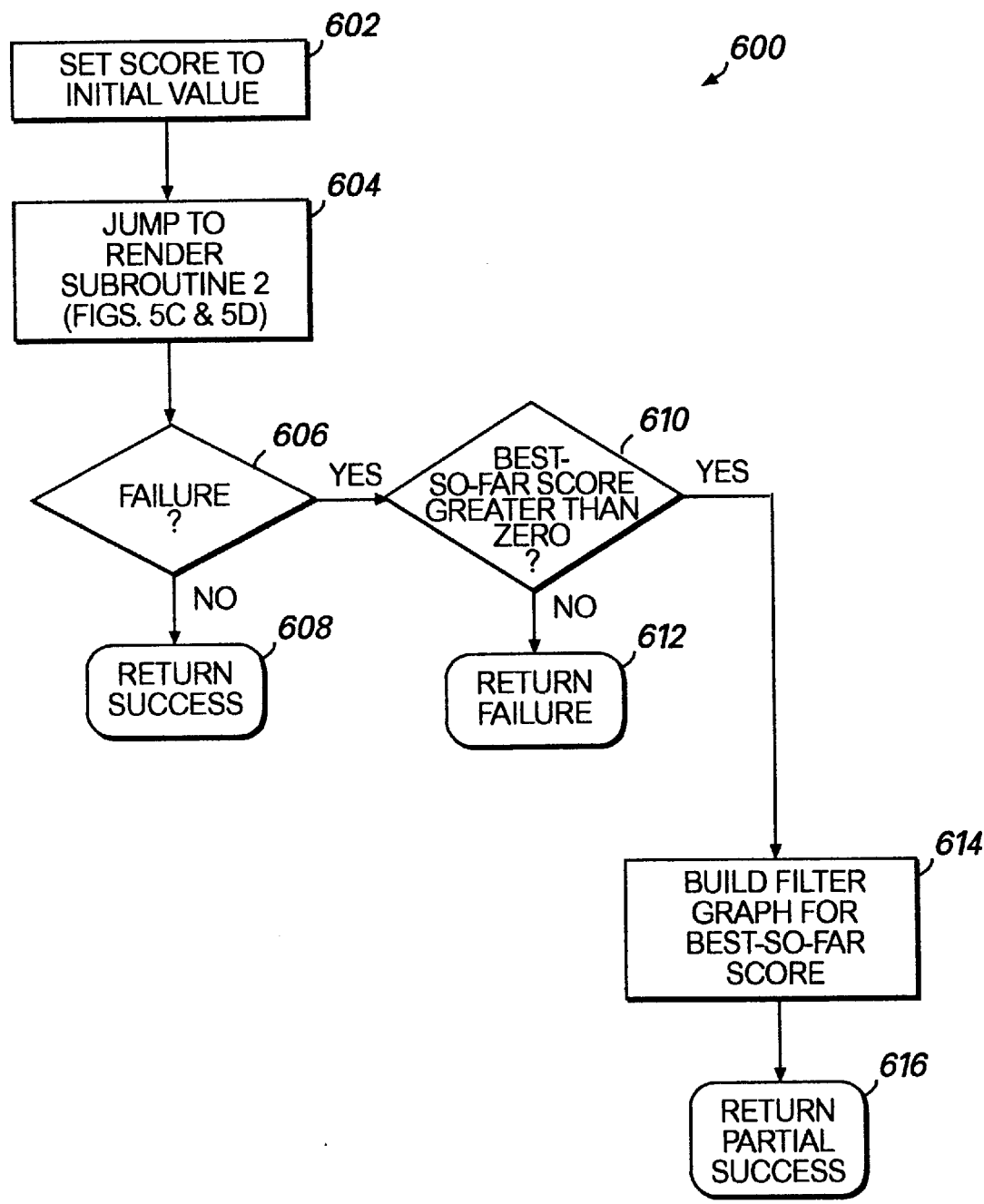
Figure 5D:
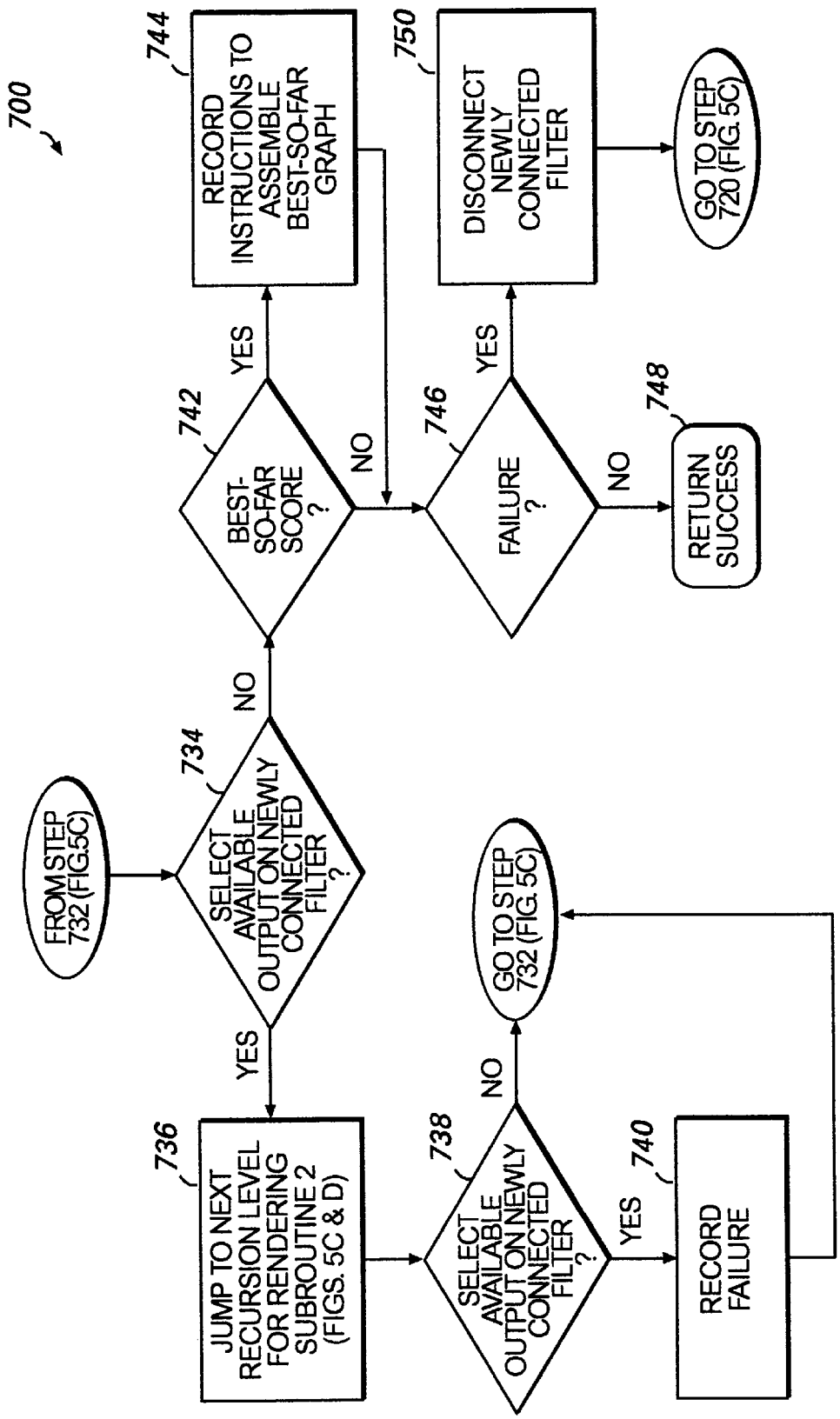

Turning now to FIGS. 5A, 5B, 5C, and 5D, which are collectively described as FIG. 5, the computer-implemented process for constructing a filter graph in accordance with an exemplary embodiment of the present invention will now be described. FIG. 5A illustrates the steps completed by a primary routine; FIG. 5B illustrates the steps completed by a first subroutine; and FIGS. 5C and 5D illustrate the steps completed by a second subroutine. Those skilled in the art will appreciate that a routine caller can support calls and pass parameters and values among these routines.

Referring first to FIG. 5A, which illustrates the tasks of the primary rendering routine, a source of information such as a file, is obtained in step 502 for rendering. The source file, which can be accessed from a local or remote storage medium, contains one or more data streams, each representing a media type, such as video, audio, or still images. In addition, in step 502, a success count is cleared to initialize a success counter. Similarly, in step 504, a failure count is cleared to initialize a failure counter. Consequently, steps 502 and 504 support initialization tasks for the rendering operation.

In step 506, a source filter, also called a file reader filter, is selected and loaded. Typically, the source filter can be selected by examining a table to determine available source filters compatible with the identified media type for the source file. It will be appreciated that the media type for the source file should be identified prior to attempting to select a compatible source filter. This can be accomplished by looking for a match between values stored in the table and corresponding values read at selected predetermined portions of the source file In step 508, an inquiry is conducted to determine whether the source filter has been successfully loaded. If not, the "NO" branch is followed from step 508 to step 510 and the rendering process fails. On the other hand, the "YES" branch is followed from step 508 to step 512 in the event that the source filter is successfully loaded to support a reading of the data stream(s) of the source file.

In step 512, an inquiry is conducted to determine whether the selected source filter has an available output. If not, the "NO" branch is followed to step 514, and an inquiry is conducted to determine whether the rendering operation has resulted in any failure. If so, the "YES" branch is followed from step 514 to step 516, and an inquiry is conducted to determine whether the rendering operation has resulted in any success. If so, the "YES" branch is followed from step 516 to step 518 and the rendering operation is successfully completed. Similarly, if the response to the inquiry conducted in step 514 is negative, the "NO" branch is followed to step 518. However, if the rendering operation has not resulted in any success, the "NO" branch is followed from step 516 to step 520, and the rendering process terminates in failure.

If an output is available for the selected source reader in step 512, the "YES" branch is followed from step 512 to step 522. In step 522, an available output of the source filter is selected and the process proceeds to step 524. In step 524, a call is made to the first subroutine, and the primary rendering routine jumps to the first subroutine shown in FIG. 5B. Upon returning from the first subroutine of FIG. 5B, the rendering process proceeds to step 526, as shown in FIG. 5A.

In step 526, an inquiry is conducted to determine whether the rendering operation has succeeded. If so, the "YES" branch is followed to step 528 and a success is counted by the success counter. If the response to the inquiry is negative, then the "NO" branch is followed to step 530 and the failure counter is incremented. From either step 528 or step 530, a loop is followed to step 512 to support the rendering of each remaining output of the source file filter. Thus, a single pass through the tasks of the primary routine 500 will result at best in the rendering of a single output of the source filter. It is necessary to complete selected tasks of the primary routine, as evidenced by the loop, to render remaining output(s) of the source filter.

Turning now to FIG. 5B, the first subroutine 600 is initialized in step 602 by setting a score to an initial state. The score, which preferably comprises three components, (1) a trial proportion representing the proportion of source file data streams currently under consideration by the filter graph manager, (2) a working proportion of source file data that can be rendered as a result of connected filters, and (3) the number of filters that have been added to achieve this rendering result. To initialize a score, the trial proportion is preferably set to one hundred percent, the working proportion is preferably set to zero percent, and the number of filters is set to zero, i.e., <100%, 0%, 0>. A score is updated for each leg of a chain of filters forming a filter graph.

In step 604, the first subroutine 600 jumps to a second subroutine 700, which is shown in FIG. 5C. The second subroutine 700 attempts to render the selected output of the source filter by connecting one or more filters in a chain of the filter graph. Upon returning from the second subroutine 700, an inquiry is conducted in step 606, to determine whether this rendering operation has failed. If not, the "NO" branch is followed to step 608, and a success message is returned. In this manner, the first subroutine 600 returns to the primary routine 500 of FIG. 5A with a successful rendering result.

On the other hand, if the inquiry in step 606 is positive, then the rendering operation has failed and the "YES" branch is followed to step 610. In step 610, a determination is made whether the best-so-far score is greater than zero. This inquiry compares the best-so-far-score, which is maintained (and updated) for each attempted rendering of a leg of connected filters, to a score value of zero. If the inquiry in step 610 is negative, the "NO" branch is followed to step 612 and the first subroutine 600 returns a failure message to the primary routine 500 of FIG. 5A. In contrast, if the best-so-far score is greater than zero, the "YES" branch is followed to step 614 and instructions for building the corresponding graphs are placed in memory for possible subsequent implementation. In step 616, a partial success message is passed from the first subroutine 600 to the primary subroutine 500. Thus, the computer-implemented rendering operations described with respect to FIGS. 5A, 5B, 5C, and 5D can support a partially successful rendering of a source file.

Referring now to FIGS. 5C and 5D, the steps conducted by a second subroutine 700 are illustrated for the attempted rendering of a data stream by a leg of the filter graph. In step 702, (1) the present recursion level, which corresponds to the count maintained by the recursion counter, and (2) the filter output to be rendered is collected for use by the second subroutine 700. Initial values are passed when the first subroutine 600 calls the second subroutine 700. In step 704, a determination is made whether the recursion level is greater than a predetermined threshold, preferably defined by a maximum level of five. If so, the "YES" branch is followed from step 704 to step 706, and a failure message is returned to the first subroutine 600. In the event that the recursion count is less than or equal to the predetermined threshold, then the "NO" branch is followed from step 704 to step 708.

In step 708, a search is conducted to locate a filter that may accept the selected output as an input. For this first pass through the tasks of the subroutine 700, the selected output represents an output of the source filter. As described above with respect to FIG. 2, a table, typically stored as a part of the registry, can be examined to locate an appropriate filter matching the media type for the data stream and having the highest Merit figure. Filters already in the graph are first checked to locate a compatible loaded filter, regardless of whether this filter has the highest Merit figure. If a filter is available in the graph, then this filter is selected for possible use over a filter having a higher merit figure as defined in the table. Thus, preference is given to the use of a loaded filter over an unloaded filter having a higher Merit figure.

A search for an available filter is conducted in step 708, as described above, and, if found, the "YES" branch is followed from step 710 to step 714. If an available filter is not located in step 710, then the "NO" branch is followed to step 712. In step 712, a failure message is returned either from the second subroutine 700 to the first subroutine 600 or from a deeper recursive invocation of the second subroutine 700 to the previous recursion level of the same subroutine 700.

In step 714, a determination is made whether the newly selected filter, i.e., the filter to accept the output of the prior filter as an input, is already loaded for use in the filter graph. If not, the "NO" branch is followed from step 714 to step 716, and the selected filter is loaded. In step 718, an inquiry is conducted to determine whether the loading operation is successfully completed. If not, the "NO" branch is followed from step 718 to step 708 and a search for an available filter is conducted anew. If the response to the inquiry in step 718 is positive, the "YES" branch is followed from step 718 to step 720. Likewise, if the filter is already found in the filter graph, then the "YES" branch is followed from step 714 to step 720.

In step 720, a search for an unconnected input pin of the newly selected filter is conducted. If found, the "YES" branch is followed from step 722 to step 728. If an unconnected input is not located for the selected filter, the "NO" branch is followed from step 722 to step 724. In step 724, an inquiry is conducted to determine whether the selected filter had been previously loaded for use in the filter graph. If so, the "YES" branch is followed to step 726 and the selected filter is unloaded.

The selected filter, in this case, is retained in memory, but placed on the Spares list. At the end of the entire operation, any filters still on the Spares list are discarded and thereby unloaded. This is a performance optimization task, because the actual unloading operation is deferred. Not only is the filter in question "unloaded" at this point, but the graph changes are completely backed out to return the whole graph to the same state that it was in when the filter was added. This is significant when processing a filter which has multiple outputs, where the first output has been successfully rendered by adding more filters, but a second or subsequent output fails. At this point the filters added to handle the first output must be backed out.

In the preferred embodiment, a list of all operations performed in building the graph is always kept up to date, and this same list forms the description of the best-so-far graph. This same list can also be used for backout operation described above. To return the graph to a previous state, the inverse operations are performed in the reverse order, working backwards through the list. Every connection is disconnected, and every filter is unloaded (or rather put on the Spares list).

A loop is followed from step 726 to step 708 to locate another available filter that may accept the output of the prior filter as an input. If, on the other hand, the selected filter has not been previously loaded for use in the filter graph, then the "NO" branch is followed from step 724 to step 708. Thus, a search for another available filter is conducted in the event that the selected filter does not have a remaining unconnected input pin.

In step 728, the output of the present filter is connected to the input of the selected filter. In step 730, an inquiry is conducted to determine whether this connection is completed in a satisfactory manner. If not, the "NO" branch is followed to step 720 to locate another unconnected pin of the selected filter. Otherwise, the "YES" branch is followed from step 730 to step 732.

In step 732, a search is conducted for a free output pin on the selected filter, i.e., the filter for which the input data stream is passed to. In step 734, a determination is made whether a free output is located for this filter. If so, the "YES" branch is followed from step 734 to step 736. In step 736, a recursive call is made to the second subroutine 700 for the selected available output of the selected filter and an incremented recursion level. The recursion level can be incremented by a single count to indicate a completed pass through the rendering tasks of the second subroutine 700. The present score is also passed for use at the next recursion level to reflect the fraction of the data stream that can be rendered as a result of the connected filters. As described above, the score comprises the trial proportion, the working proportion, and the number of filters that have been added to achieve a rendering result.

If this recursive call to the subroutine 700 fails, the "YES" branch is followed from the inquiry in step 738 to step 740 and this failure is noted. From either step 740 or the "NO" branch of step 738, a loop is completed to return to step 732 of the second subroutine 700 to begin anew the search for a free output of the selected filter.

If the inquiry in step 734 results in a negative response, the "NO" branch is followed to step 742. In step 742, a determination is made whether the present score is greater than the best-so-far score. If so, the "YES" branch is followed from step 742 to step 744 and instructions for building the corresponding graph are recorded by placing the instructions in memory. From either step 744 or the "NO" branch of step 742, the process moves to step 746.

In step 746, an inquiry is conducted to determine whether the rendering operation resulted in a failure. If not, the "NO" branch is followed from step 746 to step 748, and a success message is returned. Otherwise, the "YES" branch is followed to step 750 and the output is disconnected from the input of the selected filter. A branch is then followed from step 750 to step 720 to locate an unconnected input pin of the selected filter.

It will be appreciated that the second subroutine 700 illustrated in FIGS. 5C and 5D support a graph building process that either succeeds or returns the filter graph to its original state. In the event that the second subroutine 700 returns the filter graph to its original state, however, it also yields a best-so-far score and instructions for assembling the corresponding graph.

Figure 6:
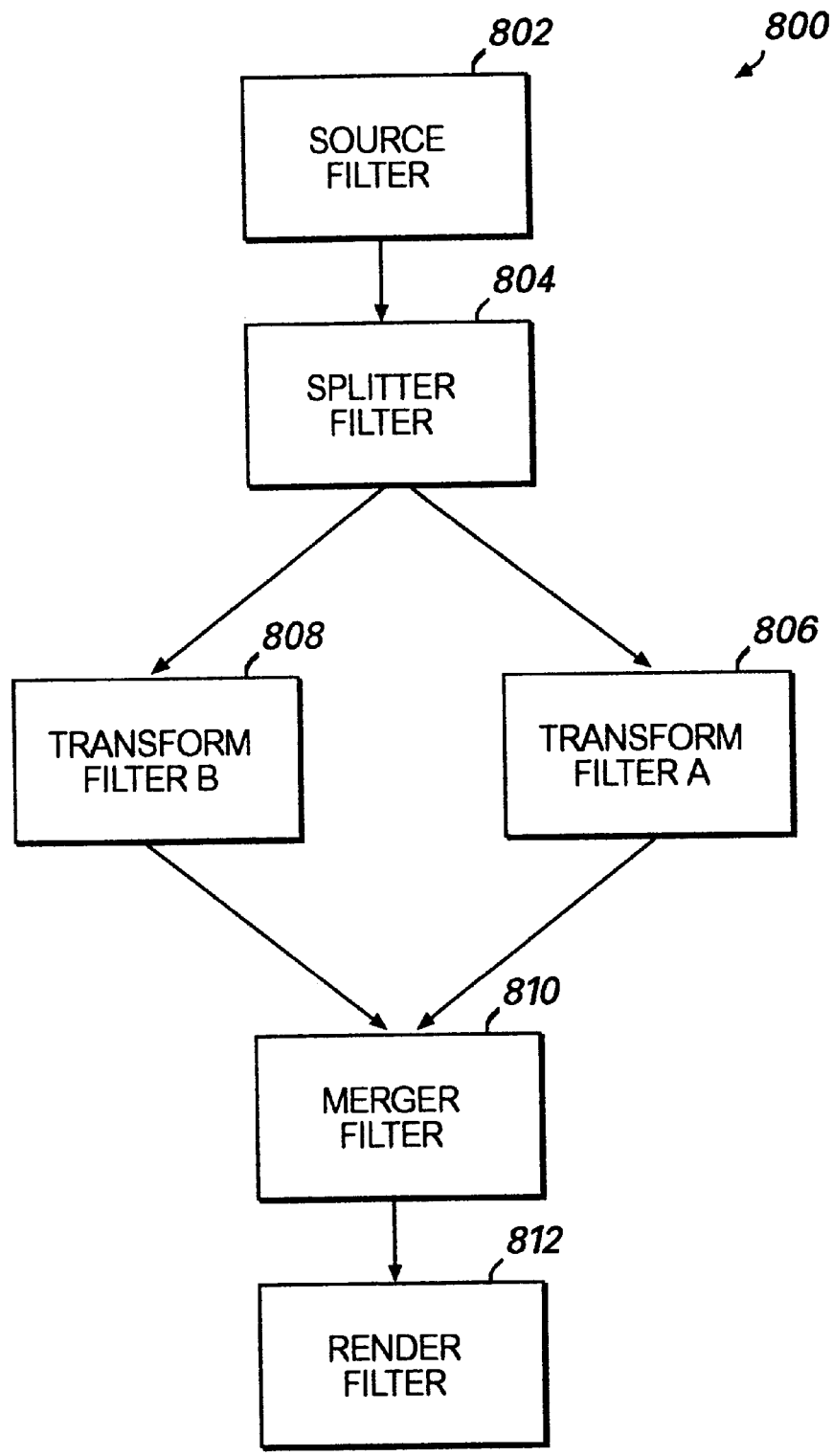
FIG. 6 is a block diagram illustrating another filter graph constructed in accordance with an exemplary embodiment of the present invention.

FIG. 6 is a block diagram illustrating the representative example of a filter graph constructed in accordance with an exemplary embodiment of the present invention. Referring now to FIG. 6, a filter graph 800 comprises six filters, including a source filter 802, a splitter filter 804, transform filters 806 and 808, a merger filter 810, and a render filter 812. The source filter 802 is responsible for reading the data streams of the source file. The input of the splitter filter 804 accepts the output of the source filter 802. In other words, the input of the splitter filter 804 is connected to the output of the source filter 802. The splitter filter 804 divides the output of the source filter 802 into two separate data streams, a first data stream and a second data stream. The transform filter 806 accepts the first data stream that is output by the splitter filter 804. The transformed filter 808 accepts the second data stream output by the splitter filter 804. The merger filter 810 accepts the output of each of the transformed filters 806 and 808. The merger filter 810 operates to merge the data streams output by the transformed filters 806 and 808 and, in turn, outputs a merged data stream to the render of filter 812. The render filter 812 renders the merged data stream to complete the processing of the source file.

To illustrate the construction of the filter graph 800, it is useful to review the steps completed by the primary routine 500 and the first and second subroutines 600 and 700. Turning now to FIGS. 5A, 5B, 5C, 5D and 6, the success and failure counts are cleared to initialize the success and failure counters to known state. A compatible source filter, the source filter 802, is then loaded to read the source file. The source filter 802 is preferably selected after a review of a table containing information regarding available filters, including the media types supported by these filters. Significantly, this search of information in the table to support the selection of an appropriate filter allows the filter graph construction concepts embodied by the present invention to be extended to a wide variety of media types. In response to selecting the source filter 802, an available output is then identified for possible connection to an input of another filter. For the filter graph 800 shown in FIG. 6, the output of the source filter 802 is selected for connection as an input to another filter. At this point, the primary rendering routine jumps to the first subroutine 600 to render the selected output of the source filter 802.

The initial score for this first leg of the filter graph 800 is set to an initial value <100%, 0%, 0> prior to attempting to connect the selected output of the source filter 802 to another filter. The first subroutine 600 then jumps to the second subroutine 700. Information regarding the present recursion level and the output to be rendered is passed from the first subroutine 600 to the second subroutine 700. Because the recursion count is less than a predetermined threshold, a search is conducted to locate an available filter that may accept the selected output of the source filter 802 as an input. In this case, the splitter filter 804 is selected and loaded for use in the filter graph 800. A search for an available input pin of the splitter filter 804 is now conducted, which results in finding an input available for connection to the output of the source filter 802. In turn, the input of the splitter filter 804 is connected to the output of the source filter 802.

In response to successfully completing this connection, a search is conducted to locate an available output of the splitter filter 804. (assumption: any input pin of a filter is connected to each output pin of a filter). Those skilled in the art will appreciate that a failure to locate an output for a filter suggests that this filter is a renderer. For the representative filter graph shown in FIG. 6, however, the filter 804 conducts a splitting operation and comprises two separate outputs, a first output and a second output. The first output of the splitter filter 804 is located in response to the search for an available output of that filter. In turn, a recursive call is made to the second subroutine 700 to process the outputs of the splitter filter 804. The recursion level is incremented to the next recursion level, namely, Level 1, and the tasks of the second subroutine 700 are completed again for the first output of the splitter filter 804.

At recursion Level 1, the transform filter 806 is located, loaded, and connected to the first output of the splitter filter 804. In response to a successful connection of the input of the transform filter 806 to the first output of the splitter filter 804, a search is conducted for an available output of the transform filter 806. The single output of the transform filter 806 is located, and, in response, a recursive call is made once again to the second subroutine 700. The recursion level is incremented to the recursion Level 2 prior to conducting the task of the second subroutine 700 again.

For recursion Level 2, a search is conducted for an available filter that may be connected to the selected output of the transform filter 806. This search results in the selection of the merger filter 810. The merger filter 810 is loaded and its input is connected to the selected output of the transform filter 806. A search is then conducted to locate an available output for the merger filter 810. This search results in finding the single output of the merger filter 810. Consequently, a recursive call is made once again to the second subroutine 700, and the recursion level is incremented to the next level. Specifically, the recursion level is now set to Level 3.

For recursion Level 3, a search is conducted for an available filter for possible connection to the selected output of the merger filter 810. This search results in finding the renderer filter 812, which is loaded and connected to the merger filter 810. In contrast to the remaining filters of the filter graph 800, the renderer filter 812 does not have an output. Consequently, the search for an available output of the renderer filter 812 results in failure. Because an available output is not located for the render of filter 812, a determination is made whether the score for this filter chain is greater than the best-so-far score. The chain of the filters 802, 804, 806, 810, and 812 results in a rendering of one-half of the source file and comprises five filters. Thus, this score (<50%, 50%, 4>) is greater than the prior score (<100%, 0%, 0>) initially defined by the first subroutine 600. Based on this result, the instructions for assembling this filter chain are recorded and a success message is returned for this recursion level, namely, Level 4.

As the recursive calls return success, the filter chain is effectively walked in the upstream direction and at each level any remaining outputs of the filters in this filter chain are rendered (possible causing further recursive calls and in due course return therefrom). No additional outputs are located for the merger filter 810 and, consequently, the score for Level 4 of the filter chain is compared to the best-so-far score. The score for Level 4 is the same score returned from the deeper recursive level i.e., <50%, 50%, 4>. Thus, the score for Level 4 does not beat the best-so-far score, so there is no need to record the instructions for assembly of this portion of the filter graph. A success message is returned again to the second subroutine 700 at recursion level, Level 3.

At recursion Level 3, a search is conducted for additional outputs of the transform filter 806. Because the transform filter 806 has only a single output, there is no need to attempt to connect another filter to the transform filter 806. Again the returned score is equal to the best-so-far score. Again a success message is returned, thereby returning to the subroutine 700 at the next prior recursion level, Level 2.

At recursion Level 2, a search is conducted by the subroutine 700 to determine whether the splitter 804 has an available output for possible connection to another filter. For the splitter filter 804, the second output (audio) remains available for connection to another filter. Consequently, the second output of the splitter filter 804 is selected and the recursion level is once again incremented as part of the recursive call to the second subroutine 700. The score is now again <50%, 50%, 4> but the first 50% (the trial proportion) now represents the audio stream being considered, whereas the second 50% (the working proportion) represents the video stream for which a working graph has been constructed. The number of filters (4) is the cumulative total added for all streams to date.

At the next recursion count, Level 3, a search is conducted for a filter that may accept the second output of the splitter filter 804 as an input. In this case, the transform filter 808 is selected and loaded. In turn, the input of the transform filter 808 is selected and connected to the second output of the splitter filter 804. In response to the successful connection of the second output pin to this input pin, a search is conducted for an available output of the transform filter 808. The single output of the transform filter 808 is located for possible connection to another filter. Consequently, a recursive call is made again to the second subroutine 700 and the recursive count is incremented to Level 4.

At Level 4, a search is conducted for an available filter that may accept as an input the output of the transform filter 808. In this case, the merger filter 810 is located for connection to the transform filter 808. Because this filter is already in the graph, it is considered first before looking at the Spares list or considering Merit figures. As a result of constructing the first filter chain of the filter graph, the merger filter 810 was loaded and placed within the filter graph. Thus, there is no need to reload the merger filter 810 for connection to the transform filter 808. An available input of the merger filter 810 is located and connected to the output of the transform filter 808. In response to this successful connection, a search is conducted for an available output of the merger filter 810. Because there is no available output for the merger filter 810, the score for this second filter chain is compared to the best-so-far score. The score is now <50%, 100%, 5>. As the working proportion is now 100%, the score for Level 4 is greater than the best-so-far score, and, consequently, the instructions for assembling this filter graph are recorded. A success message is returned and the tasks for the second subroutine 700 are now completed for recursion Level 2 to determine if available outputs remain for the splitter filter 804.

The search for another available output of the splitter filter 804 at Level 2 results in failure. Consequently, the tasks of the second subroutine 700 are conducted again for the source filter 802 at recursion Level 1. The source filter 802 does not have another available output. Consequently, a success message is returned to the first subroutine 600 at recursion Level 0.

For recursion Level 0, an inquiry is conducted to determine whether the rendering operations completed by the second subroutine 700 have failed. Because the rendering operations conducted by the second subroutine 700 have resulted in construction of a filter graph that successfully renders the source file, a success message is returned by the first subroutine 600 to the primary routine 500. The primary routine 500 determines that the assembled filter graphs successfully renders the source file and therefore increments the success counter. Because the source filter 802 does not have another available output, rendering operations are completed and the primary routine 500 terminates with a successful result.

It will be understood that FIGS. 5A, 5B, 5C, and 5D do not illustrate clean-up operations that occur at the conclusion of the rendering tasks. These clean-up tasks include discarding any temporary data which is no longer needed, for example, the description of the best-so-far graph and the Spares list. In a modern programming language, such as C++, these tasks may well be performed automatically by class destructors without the need for explicit coding.

In summary, the present invention processes multimedia data by an automated assembly of a filter graph comprising filter components operative to conduct processing operations on data stream(s) of a source. The filter graph can be assemble by selecting appropriate filters that can handle the data processing requirements for these data stream(s). For example, a graph can be constructed by (1) selecting a set of filters and (2) combining these filters within the architecture of a filter graph to efficiently process the multimedia data.

An exemplary embodiment of the present invention provides a flexible filter graph architecture for automatically connecting filters to perform filtering operations on a source file containing at least one data stream. A filter graph can be assembled by conducting the following steps:

1. Parse the source file to select a source filter that can accept as an input a one of the data streams of the source file, and load the source filter.

2. Select an output of source filter.

3. For the selected output of the source filter, select and connect a new filter that can accept the selected output from the source filter as an input to the new filter.

4. If the connection is successfully completed, then proceed to step 5; otherwise disconnect the new filter and repeat step 3 for another filter.

5. In the event that the newly connected filter has an output, then select the output of this connected filter.

6. For the selected output of the newly connected filter, select and connect another filter that can accept the selected output as an input to the new filter.

7. If the connection is successfully completed, then proceed to step 8; otherwise disconnect the new filter and repeat step 6 for another filter.

8. Repeat steps 5–7 until the selected data stream is rendered.

9. Repeat steps 2–8 for each remaining output of the source filter to render any remaining data streams of the source file.

The foregoing system may be conveniently implemented in one or more program modules that are based upon the flow charts in FIGS. 5A, 5B, 5C, and 5D. No particular programming language has been required for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing embodiments of the present invention, and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. However, those skilled in the art will understand that the principles of the present invention apply to any process that attempts to automatically identify and select filter components, based on a determination of the media type of the underlying source information, to construct a filter graph for the processing of multimedia data.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for rendering a data stream of a source having a media type, comprising the steps of:

Reading a table of filter characteristics;

In response to reading the filter characteristics listed in the table, identifying a plurality of filters available for operation in a filter graph;

Creating an instance of a class of filters from the identified filters appropriate for rendering the data stream, each filter operative to conduct a processing operation and having at least one input pin, at least one output pin, or a combination of input and output pins; and Connecting the pins of the filters to assemble the filter graph comprising connected filters, wherein the first filter in the filter graph accepts the data stream and the final filter in the filter graph renders the data stream.

2. A method for automatically connecting filters to perform multimedia processing operations on a source file containing at least one data stream, comprising the steps of:

1) Selecting a source filter that can accept as an input a selected one of the data streams of the source file, and loading the source filter;

2) In the event that the source filter has an available output, selecting one of the outputs of the source filter;

3) For the selected output of the source filter, selecting and connecting another filter that can accept the selected output from the source filter as an input to the newly selected filter;

4) If the connection of the source filter to the selected filter is successful, then proceeding to step 5; otherwise disconnecting the selected filter and repeating step 3 for another filter;

5) In the event that the selected filter has an output, then selecting the output of the selected filter;

6) For the selected output of the selected filter, selecting and connecting a new filter that can accept the selected output from the selected filter as an input to the new filter;

7) If the connection of the selected filter to the new filter is successful, then proceeding to step 8; otherwise disconnecting the new filter and repeating step 6 for another filter;

8) Repeating steps 5–7 until the selected data stream is rendered by a chain formed by the connected filters; and 9) Repeating steps 2–8 for each remaining output of the source filter to render each remaining data stream of the source file.

3. A system for automatically rendering each data stream maintained in a source file by constructing a graph of filters, comprising:

a filter graph manager for (1) determining the filters available that can accept a data type corresponding to each data stream and (2) controlling interconnection of selected ones of the available filters to assemble the filter graph, comprising interconnected filters, which accepts and renders each data stream; and communication interfaces for supporting communication between the filter graph manager and a program module that can make direct calls to the filter graph manager to control a selected data stream or to retrieve filter-related events.

4. The system recited in claim 3, wherein the filter graph manager comprises a filter mapper for reading a table and, in response to filter characteristics listed in the table, determining the available filters.

5. A method for automatically connecting filters to perform processing operations on a source file containing at least one multimedia data stream characterized by a media type, comprising the steps of:

determining available filters that match a media type for a selected data stream of the source file, each available filter having a merit figure defining its effectiveness for working with the media type;

selecting available filters having a highest merit figure defining the suitability of the corresponding filter for a particular processing task; and linking filters having the highest merit figure until the selected data stream is rendered by a filter graph constructed from the linked filters.

6. A method for automatically connecting filters to perform filtering operations on a source file containing at least one data stream characterized by a media type, comprising the steps of:

1) Examining the source file to determine (1) a source of the source file and (2) the media type of a selected one of the media streams;

2) Searching a table containing a listing of characteristics of available ones of the filters, including a merit figure assigned to each filter to reflect a priority level for using the corresponding filter, and selecting a source filter based on the media type of the selected data stream and availability of the source file, wherein the source filter can accept as an input the selected data stream;

3) Loading the selected source filter;

4) Determining whether the selected source filter has an available output and, if so, selecting one of the available outputs of the source filter;

5) For the selected output of the source filter, examining the table and select, load, and connecting a new available filter that can accept the selected output from the source filter, wherein the selected new filter has the highest merit figure of the available filters compatible with the media type of the selected data stream and listed in the table;

6) If the connection of the source filter to the selected new filter is successful, then proceeding to step 7; other wise disconnecting the selected new filter and returning to step 5 for another filter having the next highest merit figure and compatible with the media type of the selected data stream, 7) In the event that the selected new filter has an output, then selecting the output of the selected new filter; otherwise, disconnecting the selected new filter and returning to step 5 for another filter having the next highest merit figure of the available filters compatible with the media type of the selected data stream and listed in the table unless the selected new filter renders the selected data stream, then proceeding to step 11;

8) For the selected output of the selected new filter, selecting, loading and connecting another available filter that can accept the selected output from the selected filter, wherein the present selected filter has the highest merit figure of the available filters compatible with the media type of the selected data stream and listed in the table;

9) If the connection of the prior selected new filter to the present selected filter is successful, then proceeding to step 10; otherwise disconnecting the present selected filter and returning to step 8 for another available filter;

10) Repeating steps 7–9 until the selected data stream is rendered;

11) Repeating steps 2–10 for each remaining output of the source filter to render the remaining data streams of the source file.

7. The computer-implemented method of claim 1 further comprising the step of selecting the first filter, prior to adding the first filter to the filter graph, by searching the filters in the filter graph to locate one of the filters that is compatible with the media type for the data stream.

8. The computer-implemented method of claim 7 further comprising the step of selecting the first filter, prior to adding the first filter to the filter graph, by searching a table comprising characteristics of a plurality of available ones of the filters to locate one of the available filters that is (a) compatible with the media type for the data stream (b) operative to perform the processing operation needed for its position within the filter graph, and (c) is loaded for operation with a computer.

9. The computer-implemented method of claim 7 further comprising the step of selecting each intermediate filter and the final filter, prior to adding each intermediate and the final filter to the filter graph, by searching a table to locate a corresponding available filter that is (a) compatible with the media type for the data stream and (b) operative to perform the processing operation needed for its position within the filter graph.

10. The computer-implemented method of claim 7 further comprising the step of selecting each intermediate filter and the final filter, prior to adding each intermediate and the final filter to the filter graph, by searching a listing to locate a corresponding available filter that is:

(a) compatible with the media type for the data stream, (b) operative to perform the processing operation needed for its position within the filter graph, and (c) is loaded for operation with a computer.

11. The computer-implemented method of claim 10, wherein the listing contains filters which have been loaded for operation with the computer and have not yet been added to the filter graph.

12. The computer-implemented method of claim 7 further comprising the step of selecting each intermediate filter and the final filter, prior to adding each intermediate and the final filter to the filter graph, by:

searching a listing to locate a corresponding available filter that is
(a) compatible with the media type for the data stream,
(b) operative to perform the processing operation needed for its position within the filter graph, and
(c) is loaded for operation with a computer; and in the event that the corresponding available filter is not identified in the listing, then searching a table comprising characteristics of available filters, including a merit figure assigned to each available filter for identifying a priority usage ranking, to locate a corresponding available filter that is
(d) compatible with the media type for the data stream,
(e) operative to perform the processing operation needed for its position within the filter graph, and
(f) has the highest merit figure.

13. The computer-implemented method of claim 1 further comprising the step of storing instructions for connecting the filters within the filter graph.

14. The method of claim 2, wherein step 8 further comprises repeating steps 5–7 until the selected data stream is rendered by a leg of a chain of connected filters; and further comprising, after step 8, the steps of:
in the event that the selected filter has a second output, then selecting the second output of the selected filter;
repeating steps 6–7 until the selected data stream is rendered by a second leg of the chain including filters connected to the selected second output; and
determining one of the first leg and the second leg as a best leg based upon an efficiency of performing multimedia processing operations.

15. The method of claim 14 further comprising the step, prior to step 9, of storing instructions for building the best leg.

16. The system of claim 4, wherein the filter mapper is further operative to read the filter graph to determine if one of the filters loaded and incorporated within the filter graph may be used as one of the available filters.

17. The system of claim 4, wherein the filter mapper is further operative to read a listing comprising filter identifiers to determine the available filters.

18. The system of claim 17, wherein the identifiers listed in the listing indicate the filters loaded but not incorporated within the graph of filters.

19. The system of claim 4, wherein the characteristics listed in the table include a merit figure associated with each of the filters for defining an effectiveness for working with the data type.

20. The system of claim 19, wherein the filter graph manager is operative for determining the available filters according to a priority based upon the merit figure.

21. The system of claim 3, wherein the communication interfaces comprise a direct interface for supporting communication directly between the program module and the interconnected filters, which are created by the filter graph manager.

22. The system of claim 3 further comprising instructions stored in memory for assembling the interconnected filters of the filter graph.

23. The method of claim 5, wherein the determining step further comprises searching a table comprising characteristics of the available filters to locate the available filters that match the media type for the selected data stream of the source file.

24. The method of claim 5 further comprising the step of storing instructions for constructing the filter graph from the linked filters.

25. The method of claim 5, wherein the linking step further comprises linking filters having the highest merit figure until the selected data stream is rendered by a first leg of filters of the filter graph, the first leg constructed from the linked filters wherein one of the linked filters has a first output linked within the first leg and a second output not linked within the first leg; and further comprising the step of repeating the determining, the selecting, and the linking steps until the selected data stream is rendered by a second leg of filters of the filter graph, the second output being linked within the second leg.

26. The method of claim 25 further comprising the steps of:

determining a best leg of the filter graph by comparing processing efficiencies of the first leg and the second leg; and storing instructions for constructing the best leg of the filter graph.

27. The method of claim 6, wherein step 6 further comprises maintaining the disconnected new filter within a listing of loaded filters which are disconnected before returning to step 5; and wherein step 9 further comprises maintaining the disconnected selected filter within the listing of loaded filters which are disconnected before returning to step 8.

28. The method of claim 6, wherein step 10 renders the selected data stream with a first leg of connected filters; and further comprising the step, after step 10, of maintaining a score associated with the first leg of connected filters, the score based upon a processing efficiency of the selected data stream when processed by the first leg of connected filters.

29. The method of claim 28, wherein the score is based upon a fraction of the data streams in the source file successfully rendered.

30. The method of claim 28, wherein the score is based upon a number of the filters within the chain.

31. The method of claim 28 further comprising, after step 10, the steps of:

in the event that the selected new filter has a second output, then selecting a second output of the selected new filter;

repeating steps 8–9 until the selected data stream is rendered by a second leg of connected filters, the second leg connected to the selected second output;

determining a best one of the first leg and the second leg as a best leg based upon which of the first leg and the second leg has the higher score; and storing instructions for building the best leg.

* * * * *